United States Patent [19]

Goodman et al.

[11] 4,206,748
[45] Jun. 10, 1980

[54] SOLAR ENERGY COLLECTOR WITH COLLAPSIBLE SUPPORTING STRUCTURE

[75] Inventors: Ronald D. Goodman, Sylvania; Wallace F. Krueger, Toledo; Anthony R. Shaw, Waterville, all of Ohio

[73] Assignee: Libbey-Owens-Ford Company, Toledo, Ohio

[21] Appl. No.: 909,204

[22] Filed: May 25, 1978

[51] Int. Cl.² ............................................... F24J 3/02
[52] U.S. Cl. ..................................... 126/444; 126/442; 126/416; 165/166; 138/45
[58] Field of Search ............... 126/270, 271, 444, 445, 126/447, 448, 442, 426, 416; 165/170, 166; 138/40, 41, 43, 44, 45, 46

[56] References Cited

U.S. PATENT DOCUMENTS

| 1,682,204 | 8/1928 | Wait, Jr. ............................ 165/170 X |
| 3,216,494 | 11/1965 | Goodman ............................ 165/166 |
| 3,265,121 | 8/1966 | Hickman ............................ 165/170 X |
| 3,859,980 | 1/1975 | Crawford ............................ 126/271 |
| 3,934,323 | 1/1976 | Ford et al. ........................ 126/271 X |
| 3,991,742 | 11/1976 | Gerber ............................ 126/271 |
| 4,002,200 | 1/1977 | Raskin ............................ 165/170 X |
| 4,033,326 | 7/1977 | Leitner ............................ 126/271 |
| 4,066,063 | 1/1978 | Gross et al. ........................ 126/271 |
| 4,079,726 | 3/1978 | Voelker ............................ 126/271 |
| 4,126,121 | 11/1978 | Fairbanks ............................ 126/270 |

FOREIGN PATENT DOCUMENTS

| 2731715 | 1/1978 | Fed. Rep. of Germany ........... 126/271 |
| 1464460 | 12/1966 | France ............................ 165/170 |
| 1521637 | 8/1978 | United Kingdom ............... 126/271 |

Primary Examiner—James C. Yeung
Assistant Examiner—Larry Jones
Attorney, Agent, or Firm—Collins, Oberlin & Darr

[57] ABSTRACT

A solar energy collector formed of a black plastic material in a rigid, unitary, one-piece self-supporting construction. The collector is formed with inlet and outlet manifolds and a multiplicity of fluid flow passages extending therebetween. Each passage is provided with at least one flow restriction to provide a uniform distribution of flow through all passages. A series of such collectors are connected to form an array incorporated in a multipurpose, collapsible structure for heating swimming pool water.

15 Claims, 14 Drawing Figures

SOLAR ENERGY COLLECTOR WITH COLLAPSIBLE SUPPORTING STRUCTURE

BACKGROUND OF THE INVENTION

The present invention relates generally to a solar energy collector and, more particularly, to a lightweight plastic solar energy collector especially adapted for use in heating swimming pool water and the like.

As a result of the recent energy crisis, and the environmental pollution problems associated with conventional energy sources such as fossil fuels for example, efforts have been recently made to explore alternate sources of energy. Accordingly, numerous types of solar heating units and collectors have been developed to harness the sun's energy. The majority of these known solar collectors are of the rigid frame or flat plate type which consist of a heat absorbing plate mounted in an enclosed rigid frame and which is covered by one or two sheets of glass. A series of tubes or conduits are brazed or soldered onto the heat-absorbing plate for circulating a liquid to be heated, such as water for example, therethrough.

While such known rigid collectors are serving the purposes for which they are intended, they are somewhat complicated in construction, requiring numerous parts which must be assembled and fabricated and which are relatively expensive to manufacture. Moreover, they are heavy and cumbersome in handling, often requiring auxiliary mounting arrangements and additional hardware, all adding materially to installation costs.

SUMMARY OF THE INVENTION

An object of the present invention is to obviate the above disadvantages by providing a new and improved solar energy collector formed of a lightweight plastic material in a unitary, one-piece construction and which is provided with a simple mounting or anchoring arrangement.

Another object of this invention is to provide the foregoing solar energy collector with a fluid conveying arrangement forming a multiplicity of small streams greatly enhancing heat transfer efficiency.

Still another object of the present invention is to provide fluid flow restriction means in the above conveying arrangement to assure uniform distribution of fluid flow at a uniform rate for optimum heat collection.

A further object of this invention is to provide a modular solar energy collection system comprised of any desired number of unitary solar energy collector modules serially connected in a manner providing parallel flow.

An additional object of the present invention is to incorporate the foregoing solar energy collector in a multipurpose structure for heating swimming pool water in its operative position while serving as a cabana type structure and which is collapsible into a folded position for storage while serving as an enclosure or fence for a swimming pool.

These and other objects, advantages and characterizing features of this invention will become clearly apparent from the ensuing detailed description of an illustrative embodiment thereof, taken together with the accompanying drawings wherein like reference numerals denote like parts throughout the various views.

DESCRIPTION OF THE PREFERRED EMBODIMENT

Figure 1:
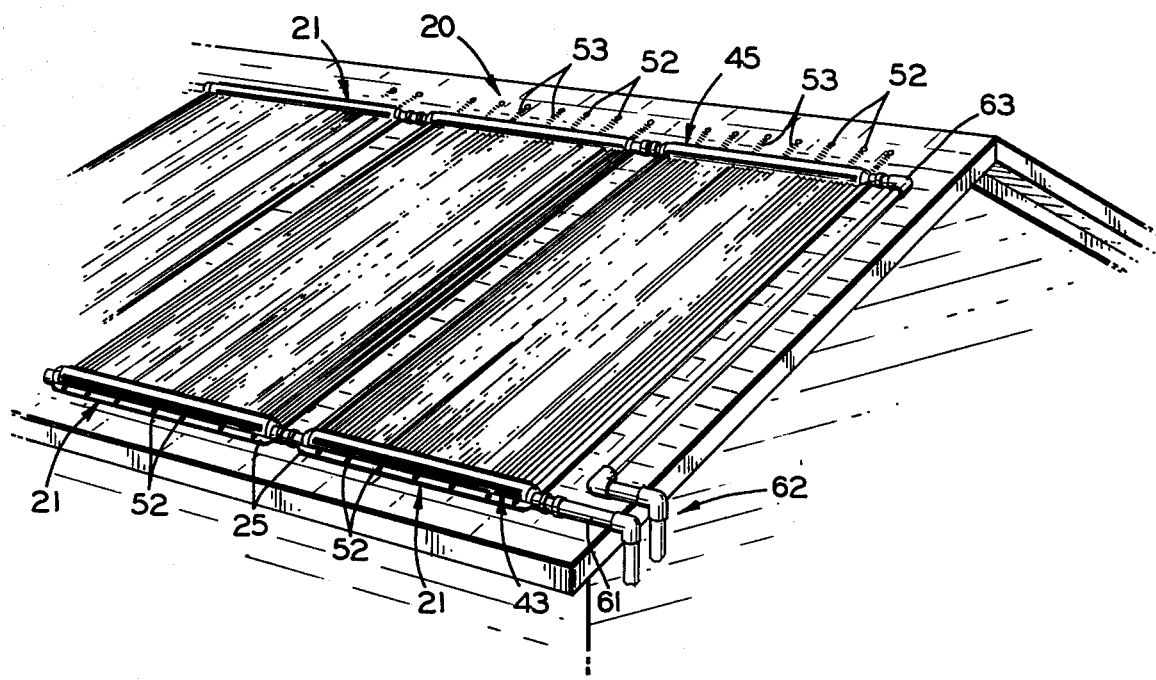
FIG. 1 is a perspective view of a modular solar energy collection system shown installed on the roof of a structure.

Referring now in detail to the illustrative embodiment depicted in the accompanying drawings, there is shown in FIG. 1 a solar energy collecting and heat transfer system, comprehensively designated 20, comprised of a plurality of solar energy collectors, generally designated 21, connected in series and which are constructed in accordance with this invention. While the system 20 is shown positioned on a sloping roof of a building and is especially suited for heating swimming pool water, it should be understood that the series of collectors 21 forming the system 20 can be positioned in any suitable place and has general utility in various fluid heating applications including, without limitation, heating water for residential use or for residential and/or commercial heating systems.

The solar energy collector 21 preferably is composed of a black plastic material, such as high density linear polyethylene, for example. While polyethylene is preferable, it should be understood that the invention is not in any way restricted to the use of such material and any other suitable black, lightweight, high temperature plastic material having similar properties of high heat absorption, durability, good abrasion resistance, and which is capable of withstanding temperature extremes, sunlight, weathering, oxidation and deleterious chemicals without consequent deterioration can be used in lieu of polyethylene, if desired.

Solar energy collector 21 is formed as a substantially rigid, unitary, one-piece construction by a one step clam shell molding process, such as that disclosed in U.S. Pat. Nos. 3,242,245 and 3,250,660 to James W. Grieg and Marvin H. Cunningham, whereby a pair of plastic sheets are supported in opposed die members which are functional along with fluid pressure means to deform the sheets against the die faces to impart the desired shape to the sheets. The sheets are fused along their marginal edges to form a hollow plastic structure and which also can be fused along certain desired areas or lines interiorly of the marginal edges to form bridging connections, such as webs, seams and the like, between the two sheets.

The solar energy collector 21 comprises a thin lower sheet member 22 and a thin upper sheet member 23 fused together along their marginal edges to form a unitary, one-piece body 24 having opposed marginal end flanges 25 and 26 and opposed marginal side flanges 27 and 28. Suitable apertures or openings 30 can be formed in flanges 25 and 26 for use in anchoring the collector 21 as will hereinafter be described.

A plurality of laterally spaced, parallel, tubular passages 31 are formed across the width of the body 24 and extend lengthwise thereof to provide conduits for the conveyance of the heat transfer fluid therethrough. Adjacent passages or conduits 31 are spaced from each other by webs 32 formed during fabrication by fusing the moldable plastic sheet members 22 and 23 together along longitudinal junctions or seams. These webs 32 separate adjacent passages 31 and also serve to reinforce the structure to provide self-supporting rigidity and the requisite strength to serve the purpose for which it is designed.

Figure 8:
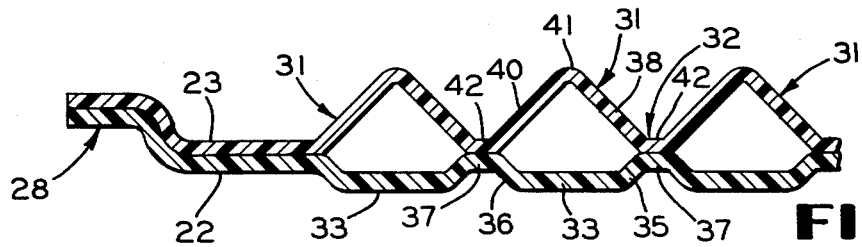
FIG. 8 is a fragmentary cross sectional view, on an enlarged scale, taken along the line 8—8 of FIG. 4.

As best shown in FIG. 8, each passage 31 is defined by an elongated tubular structure having a bottom wall and a top wall formed from oppositely displaced portions of the lower and upper sheet members 22 and 23. As used herein, the terms upper, lower, top, bottom, vertical, horizontal and the like are applied only for convenience of description with reference to the drawings (FIGS. 4, 6, 7 and 8) and should not be taken as limiting the scope of this invention. The bottom wall or lower portion of each passage 31 is defined by a planar wall portion 33 having side portions 35 and 36 that slope upwardly at angles in a diverging relation and terminate in laterally outwardly directed flanges 37 forming the lower half of adjacent webs 32. The top wall or upper portion of each passage 31 is defined by a pair of right angularly related sloping portions 38 and 40 joined at their upper ends at an apex juncture 41 and extending downwardly therefrom at angles in a diverging relation. These sloping portions 38 and 40 terminate at their lower ends in laterally outwardly projecting flanges 42 forming the upper half of adjacent webs 32, the latter being formed by the fused junction of the upper and lower members 22 and 23 during fabrication.

The particular triangular shape of the upper member 23 forming the upper sloping walls of passage 31 is significant in presenting the maximum surface area possible for exposure to solar rays. Further, these portions 38 and 40 are sloped downwardly at angles of approximately 45° relative to a true vertical to obtain optimum heat absorption from the sun's rays. Also, the passages 31 are of relatively small cross sectional areas to form the fluid conveyed therethrough into a multiplicity of small streams or rivulets to facilitate optimum heat transfer.

The opposite ends of each passage 31 are connected to and merged with common headers or manifolds 43 and 45 located at the opposite ends, respectively, of the collector body 24 and which extend substantially perpendicularly to the passages 31. For purposes of this description, manifold 43 is the inlet manifold for distributing or delivering fluid to the passages 31 and manifold 45 is the outlet manifold for collecting and removing the heated fluid from passages 31.

The manifolds 43 and 45 are identical in construction and mirror images of each other. Each manifold comprises an elongated hollow body 46 of generally bulbuous configuration in cross section having a pair of circumferentially spaced ribs 47 extending lengthwise of the body 46 adjacent the upper end thereof. The ribs 47 serve as reinforcement members adding rigidity to body 46. The lower end of the manifold is substantially flat to generally conform to a planar supporting surface. The outer ends of body 46 are provided with radially inwardly converging neck portions 48 which merge into reduced diameter end portions 50 of substantially cylindrical shape. These end portions 50 can be suitably connected to a piping system or the end portions 50 of adjacent solar energy collectors 21 by suitable coupling means as will hereinafter be described.

In order to assure uniform fluid flow through all passageways 31 and, especially when an array of collectors 21 are connected in series in a fluid circulating system, means are provided at the inlet end of each passage 31 adjacent inlet manifold 43 for restricting fluid flow through the passage. To this end, the bottom wall defining each passage 31 is displaced upwardly, as shown at 33a of FIGS. 6 and 7, adjacent the inlet end thereof to define with the upper sloping portions 38 and 40 of the upper sheet member 23 a restricted opening 51 of generally triangular cross section. This assures adequate fluid flow through the feeder inlet manifold 43 or, through all inlet manifolds 43 connected serially in a collector array, to supply all the passages 31 and distribute the parallel flow evenly therethrough. Thus, regardless of the number of collectors 21 employed in a modular solar collecting system, each will receive and then distribute an equal volume and flow of fluid. Of course, such restrictions 51 can be formed at both ends of each passage 31, if desired.

Figure 9:
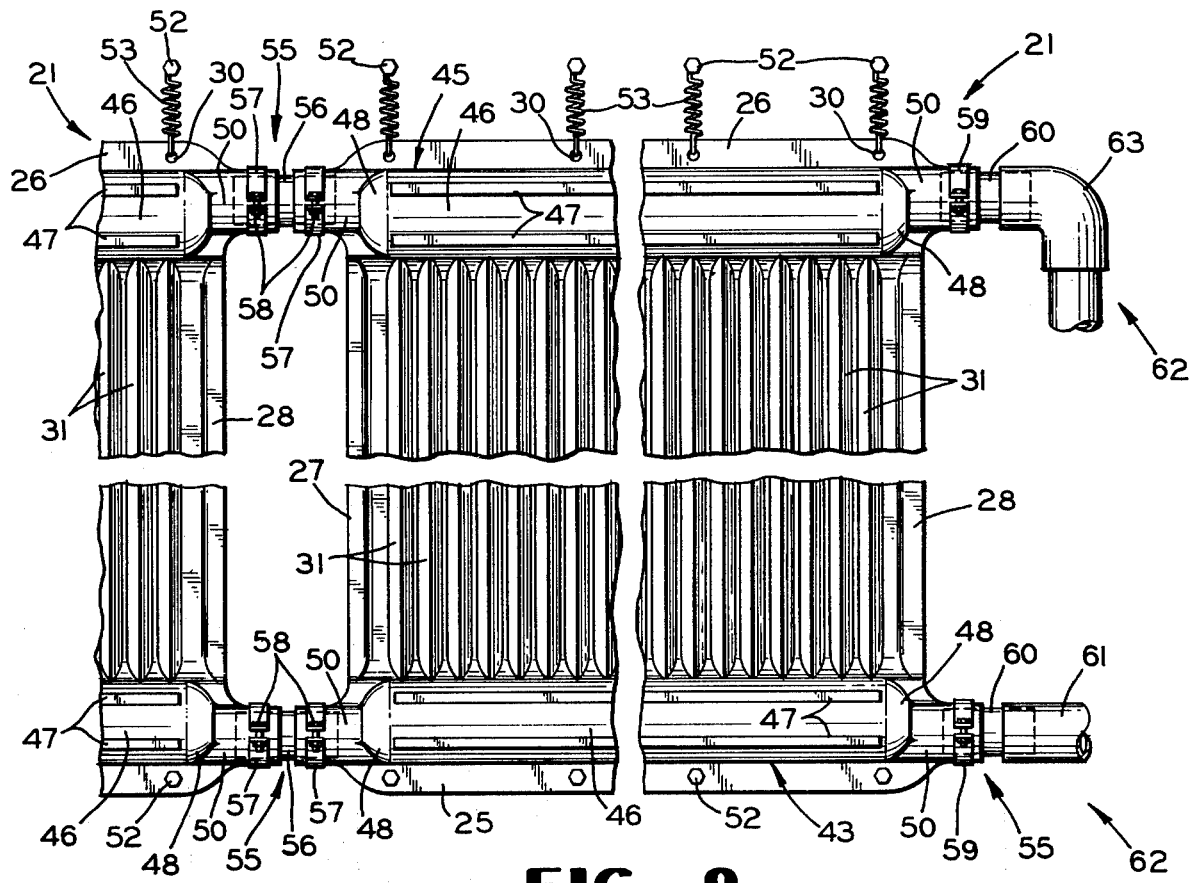
FIG. 9 is a cut-away top plan view, showing the means for connecting solar energy collectors of this invention in series to form a modular system.

As shown in FIG. 9, means are provided for resiliently securing the solar energy collector 21 of this invention, or an array of such collectors 21, to a suitable supporting surface, such as the sloping roof surface of a building for example. Such means comprise hold down anchoring fasteners 52 inserted into the roof, each securing one hooked end of a coil spring 53, the other hooked end being inserted into an opening 30 formed along the flange of the collector 21. The other end of the collector is secured by fasteners 52 inserted through openings 30 and anchored into the roof surface, as shown in FIGS. 1 and 9. This arrangement resiliently secures the collectors 21 in place while allowing for small expansion and contraction displacements thereof.

The solar energy collector 21 of this invention can be used singularly or in combination with a plurality of similar solar energy collectors 21 connected in series by coupling means, generally designated 55, to form a modular solar energy collection array as shown in FIGS. 1 and 9. The coupling means 55 preferably includes a rigid, tubular connecting insert 56 having an outside diameter slightly smaller than the inside diameter of adjacent manifold end portions 50 for insertion thereinto. A pair of clamps 57 are disposed about the adjacent manifold end portions 50 and are tightened or relaxed, as required, by suitable fasteners 58. Of course, other coupling arrangements may be substituted for the preferred coupling means 55 described above, if desired.

In a modular solar energy collection system, the first of an array of solar energy collectors can be connected at manifold end portion 50 by means of a clamp 59 and tubular connecting insert 60 to an inlet pipe 61 of a fluid circulating system 62. The outlet manifold end portion 50 is connected by a similar means to an outlet elbow 63 of the fluid circulating system 62. The inlet and outlet manifold portions on the far end of the last solar energy collector 21 of the array can be suitably plugged, thus completing the fluid circulating system. While not limited thereto, the solar energy collector 21 of this invention, or an array of any number of such collectors 21, preferably is used to heat or elevate the temperature of water in swimming pools. The solar energy collectors 21 of the present invention are especially suited for this purpose because of their ability to heat large volumes of water by small temperature increases by recycling the water in thin rivulets or streams through the passages 31 formed between the relatively thin sheet members 22 and 23 of black plastic material.

When utilized to heat the water of a swimming pool, the latter is both the source of the water to be heated and the recipient of the heated water. Any number of solar collectors 21 can be employed in an array, as determined by the size and area of the swimming pool and the volume of water to be heated. The collector array may be supported on the roof of a building as shown in FIGS. 1 and 9, or on a ground or deck surface, or on any convenient surface exposed to direct sunlight, as desired.

Any suitable pump (not shown), including the pool pump, can be provided to pump water from the swimming pool via the fluid circulating system 62 into the inlet pipe 61 to and through the inlet manifolds 43 of the serially connected collectors 21. Water flows radially from each inlet manifold 43 through restricted openings 51 into the passages 31. The restricted openings 51 assure sufficient water flow through all inlet manifolds 43 to distribute the water evenly to and through the multiplicity of passages 31 of the several collectors 21. The inlet manifold 43 is maintained at a lower elevation than outlet manifold 45 to cause the water to flow upwardly through all passages 31 at substantially the same rate of flow. The solar heat absorbed by the corrugated upper sheet member 23 is transmitted to the water passing through passages 31 and then conveyed back to the swimming pool via outlet manifolds 45, outlet elbows 63 and the fluid circulating system 62. Suitable pressure regulating means (not shown) may be employed to control the pressure of the water flowing through the collector array. Also, one or more thermostats (also not shown) can be incorporated into the system to control actuation of the circulating pump in accordance with predetermined temperature levels of the swimming pool water to maintain the same within a desired temperature range.

Figure 2:
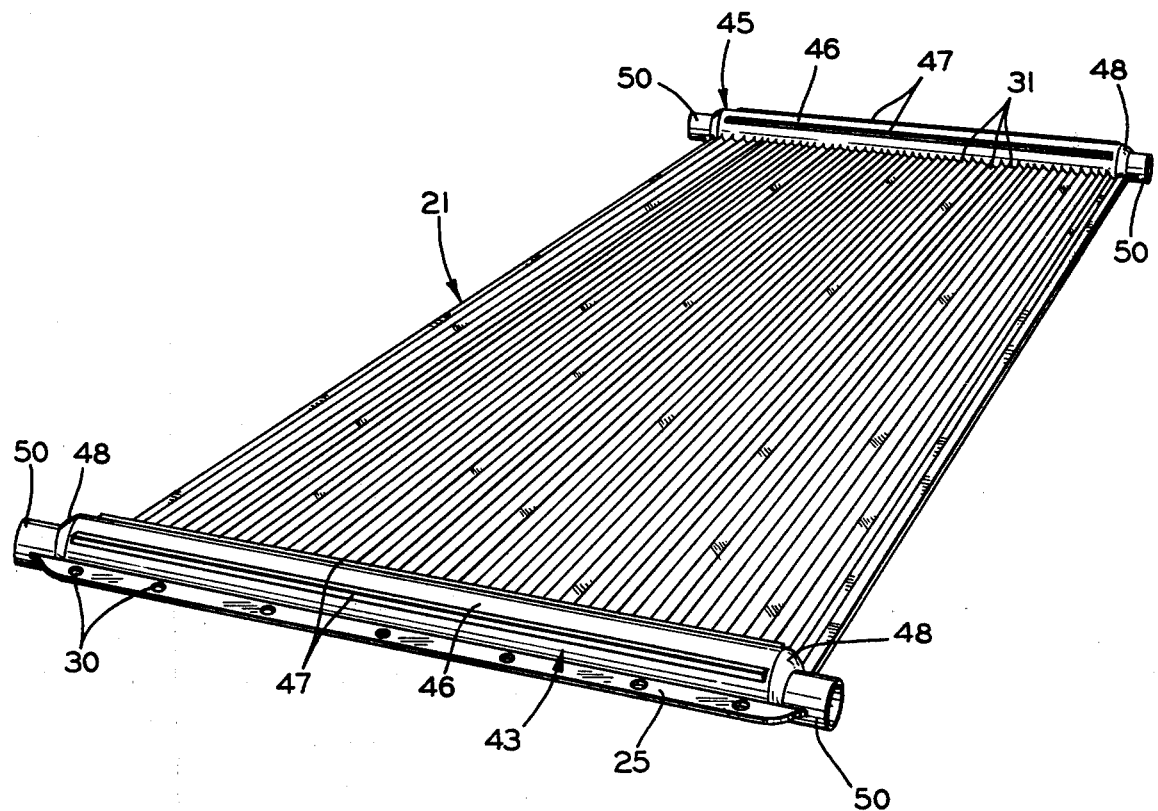
FIG. 2 is a perspective view of one form of a solar energy collector connected in accordance with this invention.
Figure 3:
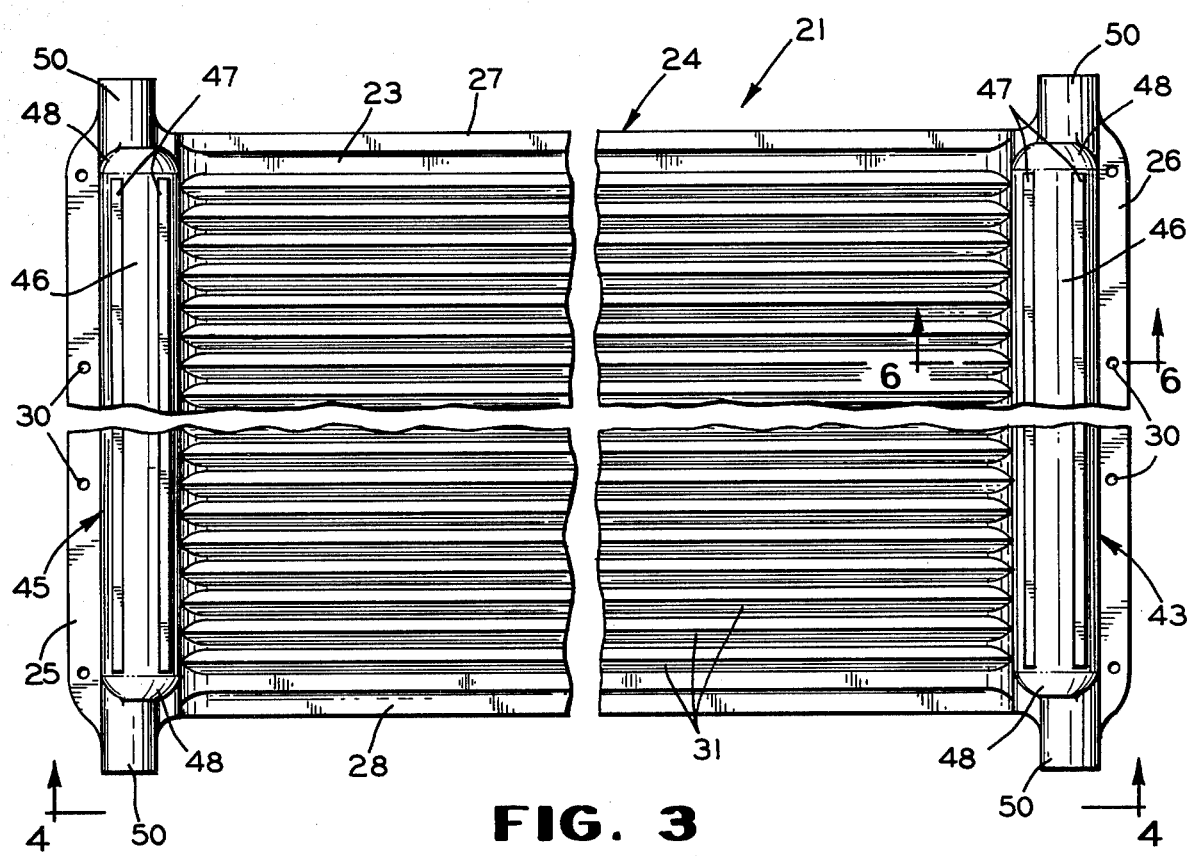
FIG. 3 is a cut-away top plan view of the solar energy collector of FIG. 2.
Figure 4:
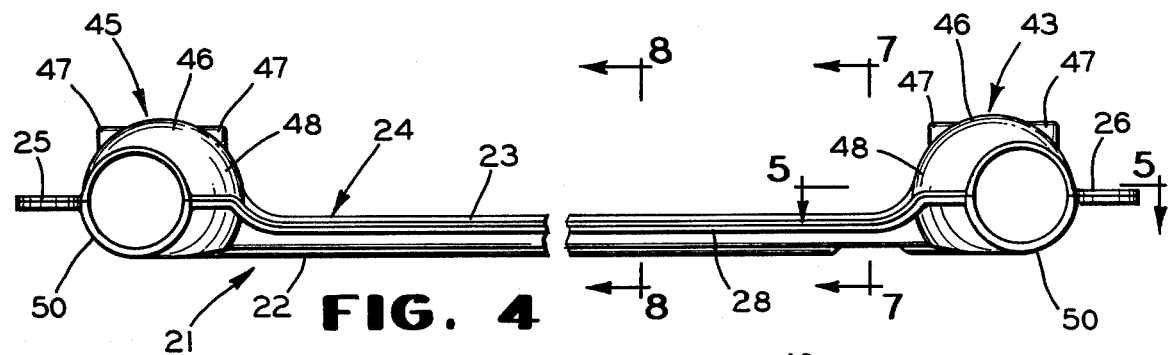
FIG. 4 is a cut-away side elevational view of the solar energy collector of FIG. 3, looking in the direction of arrows 4—4 of FIG. 3.
Figure 5:
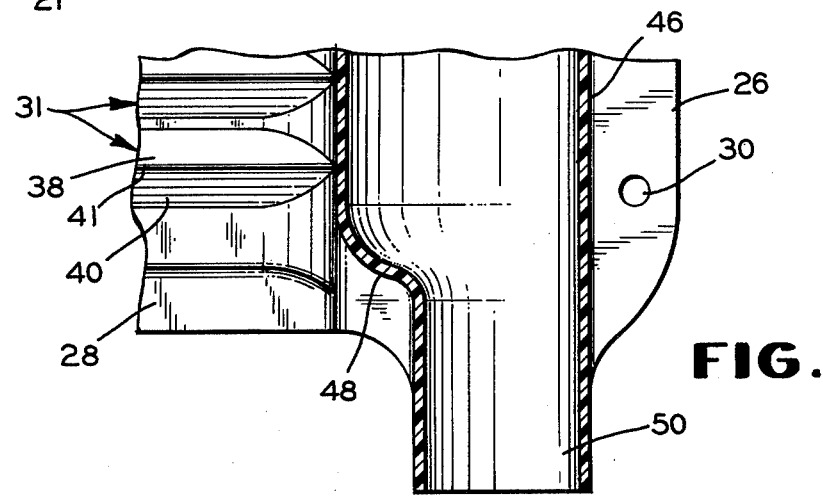
FIG. 5 is a fragmentary, horizontal sectional view, on an enlarged scale, taken along line 5—5 of FIG. 4.
Figure 6:
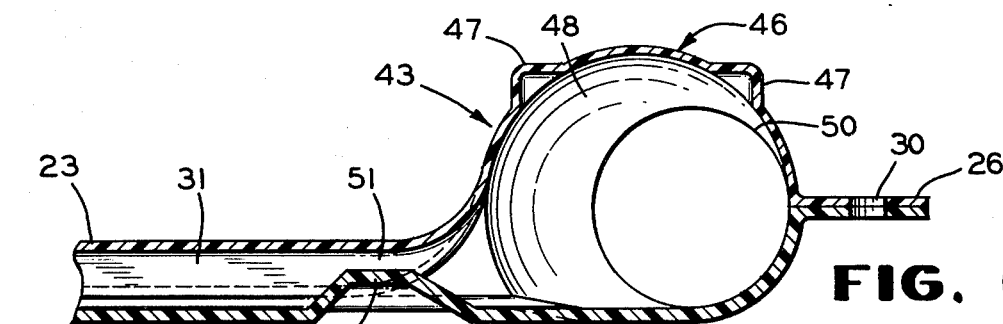
FIG. 6 is a fragmentary, vertical sectional view, on an enlarged scale, taken along the line 6—6 of FIG. 3.
Figure 7:
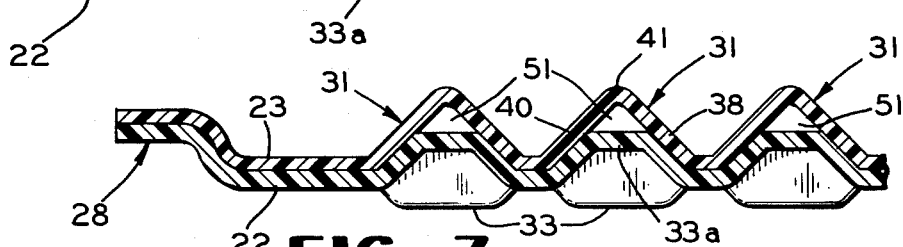
FIG. 7 is a fragmentary cross sectional view, on an enlarged scale, taken along the line 7—7 of FIG. 4.
Figure 10:
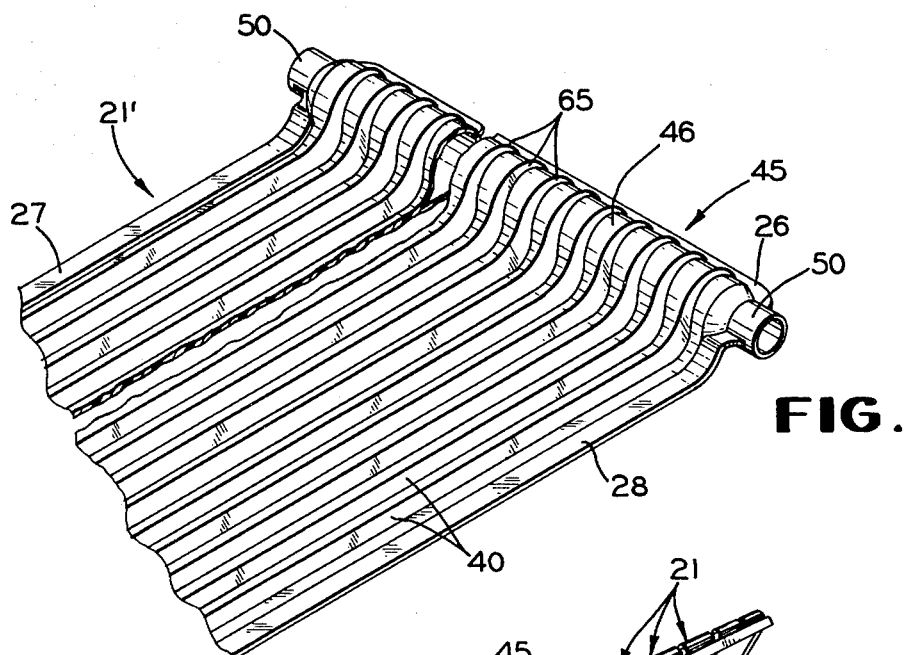
FIG. 10 is a fragmentary, perspective view of another form of a solar energy collector of this invention.

FIG. 10 illustrates a fragmentary portion of another form of solar energy collector 21' constructed and functional in the same manner as the first solar energy collector 21 described except for the provision of annular ribs 65 about the periphery of the manifolds 43 and 45. As shown in FIG. 10, these annular ribs 65 form continuations of the upper sloping walls 38 and 40 of the several passages 31 and encircle the major portion of the associated manifold, offering hoop strength to preclude expansion and possible rupturing of the manifold when subjected to higher fluid pressures than contemplated. The annular ribs 65 also offer strength and rigidity to the manifolds and can be used in lieu of the linear ribs 47 shown in FIGS. 2, 4 and 6. The remainder of collector 21' is identical to that of collector 21 first described and the same reference characters identify similar parts.

FIGS. 11-14 illustrate a modular solar energy collecting system 70 for use in heating the water of a swimming pool shown at 71 and which is incorporated in a collapsible, multipurpose structure, comprehensively designated 72. The structure 72 includes an elongated upright frame 73 adapted to be supported on a deck or ground surface and includes a planar front wall 75, a pair of end walls 76, and a top wall 77, all suitably supported and reinforced by a framework of vertically and horizontally extending bars (not shown) located behind the front wall 75. An elongated box-like base member 78, substantially coextensive with wall 75, is suitably secured to the lower end thereof and includes an elongated front wall member 80 standing on edge and spaced forwardly of wall 75 in substantial parallelism therewith and a pair of end members 81. An elongated, horizontally disposed member 82 is secured between frame wall 75 and the front wall 80 of base member 78 and serves as a shelf for storing components thereon as will presently become apparent.

A supporting bracket assembly 83 is rigidly affixed to the frame front wall 75 in spaced relation above base member 78 and comprises an elongated support member 85 coextensive with frame front wall 75 in substantial parallelism therewith, a pair of end members 86, and a plurality of longitudinally spaced cross members 87. Openings 88 are formed in the end members 86 and all, or at least certain, of said cross members 87 for a purpose that will hereinafter become apparent.

An elongated panel 90, serving as a deck in its lower extended position, is mounted adjacent its rear edge to the support member 85 for pivotal movement relative thereto by a plurality of longitudinally spaced hinges 91. The deck panel 90 is suitably supported and reinforced by a network of horizontal and vertical frame members 92 and 93, as best shown in FIG. 13. The deck panel 90 is supported in a lower inclined position on a portable, elongated footer 95 (FIG. 12) comprised of a rear wall 96, a front wall 97, an inclined top wall 98 and end walls 99 to form a rigid, box-like structure which also serves as a closure cap member for the multipurpose structure 72 when in its folded, collapsed position shown in FIG. 13.

The modular solar energy collecting system 70 embodied in the multipurpose structure 72 comprises an array of serially connected solar energy collectors 21. While it is convenient to describe the system 70 as incorporating the solar energy collectors 21 constructed in accordance with this invention and hereinbefore described in detail, it should be understood that the structure 72 of this invention is not limited to such collectors 21, but can accommodate and embody any suitable solar energy collector, or an array thereof, of either the flat plate or plastic type, as desired. The same coupling means 55 earlier described can be employed to connect the collectors 21 in series and a similar piping arrangement 62 can be utilized to convey the water from the swimming pool 71 to the inlet manifolds 43 of the several collectors 21 and then convey the heated water from the serially connected outlet manifolds 45 back to the swimming pool. The collector array is mounted, as by means of fasteners 52 and springs 53 at one end and fasteners 52 at the other end, on the outer surface of a roof panel 100 mounted adjacent the rear edge thereof on frame front wall 75 for pivotal movement relative thereto by a plurality of longitudinally spaced hinges 101. The roof panel 100 can be constructed similarly to the deck panel 90 to form rear, front and end walls suitably supported and reinforced by frame backing members. The panel 100, along with the collector array thereon, can be supported in its operative, extended position at the desired or optimum angular attitude for receiving the sun's rays to effect heat transfer. In this extended position, the panel 100 forms a portion of a cabana-like structure offering shade for bathers resting on the deck panel 90.

Means are provided for supporting the roof panel 100 along with the solar collector array in a desired angular position, such means including a plurality of detachable support struts 102, each preferably being an elongated pipe having fittings 103 at the opposite ends thereof for securement to the distal edge of roof panel 100 and insertable in an opening 88 of either an end member 86 or a cross member 87 of the bracket assembly 83. Support struts 102 can be provided in different lengths, or be formed of telescopic sections if desired, to accommodate different desired angular attitudes of the roof panel 100 and associated solar collector array 70. Also, the end fittings 103 can be threadably mounted on struts 102 to provide a fine adjustment, as desired. When not in use, the struts 102 can be detached and stored on horizontal member 82 of the base member 78.

Figure 11:
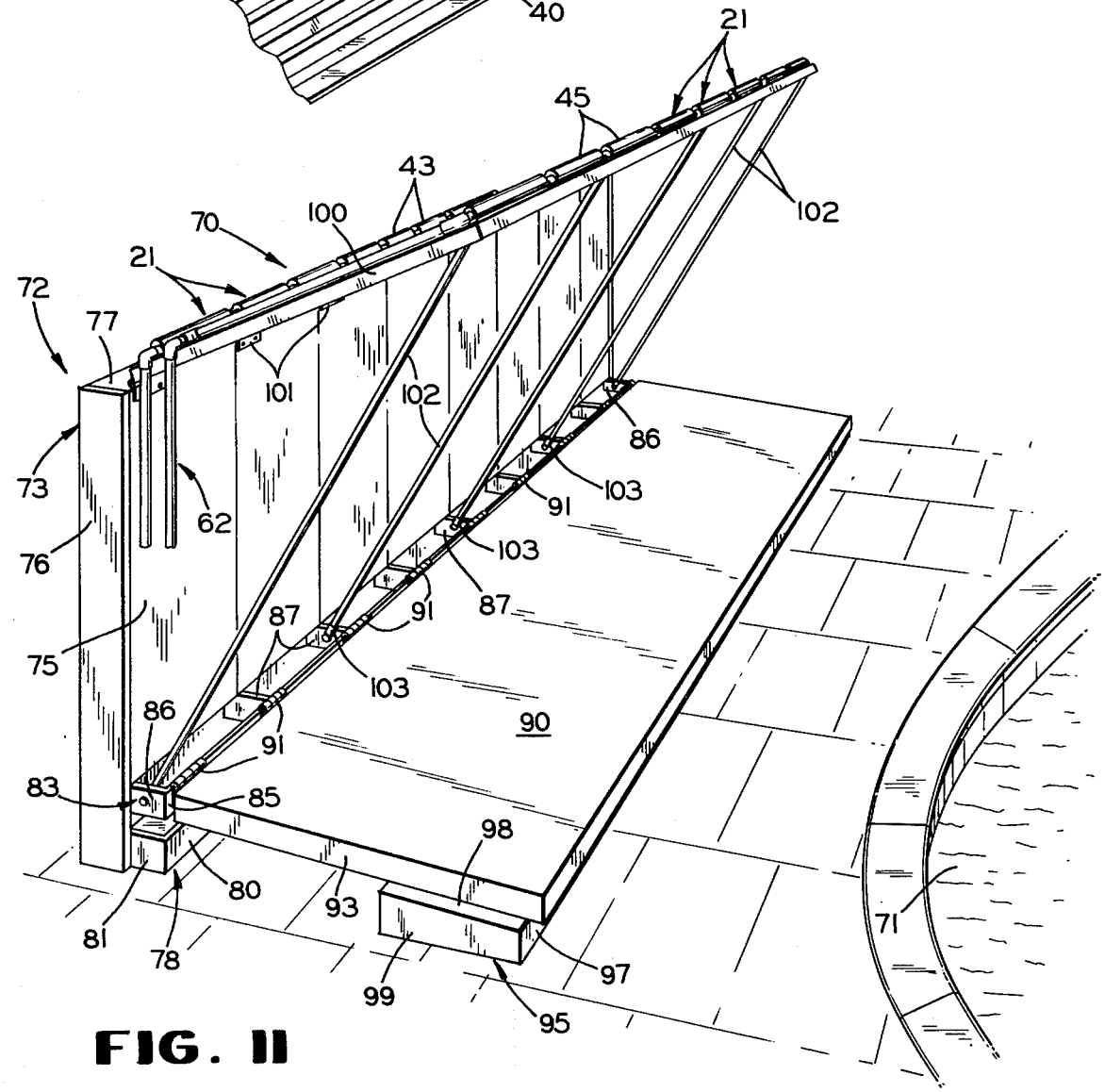
FIG. 11 is a perspective view of a multipurpose structure incorporating a solar energy collection system for use in heating the water of a swimming pool, showing the structure in an extended position and the solar energy collection system in an operative position.
Figure 12:
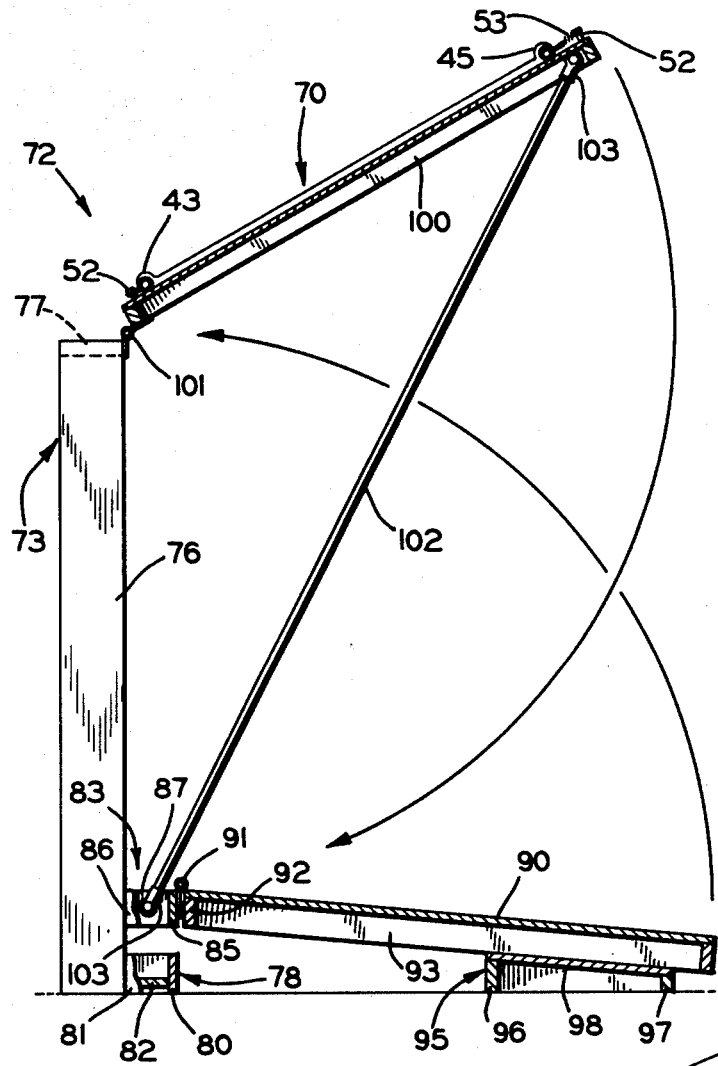
FIG. 12 is a vertical sectional view of the multipurpose structure of FIG. 11.
Figure 14:
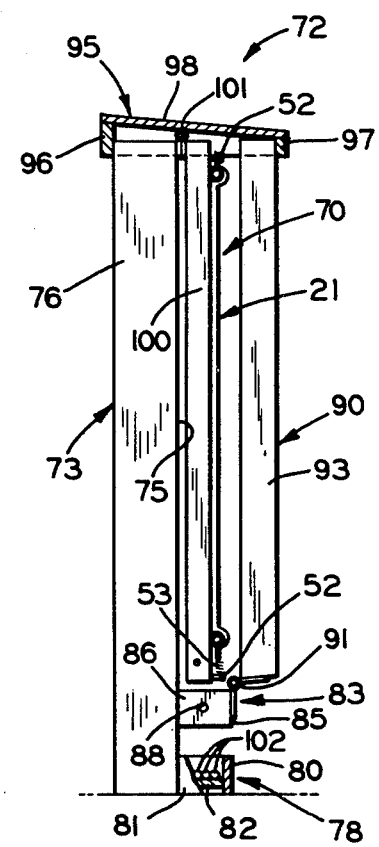
FIG. 14 is a vertical sectional view of the multipurpose structure shown in a collapsed position.
Figure 13:
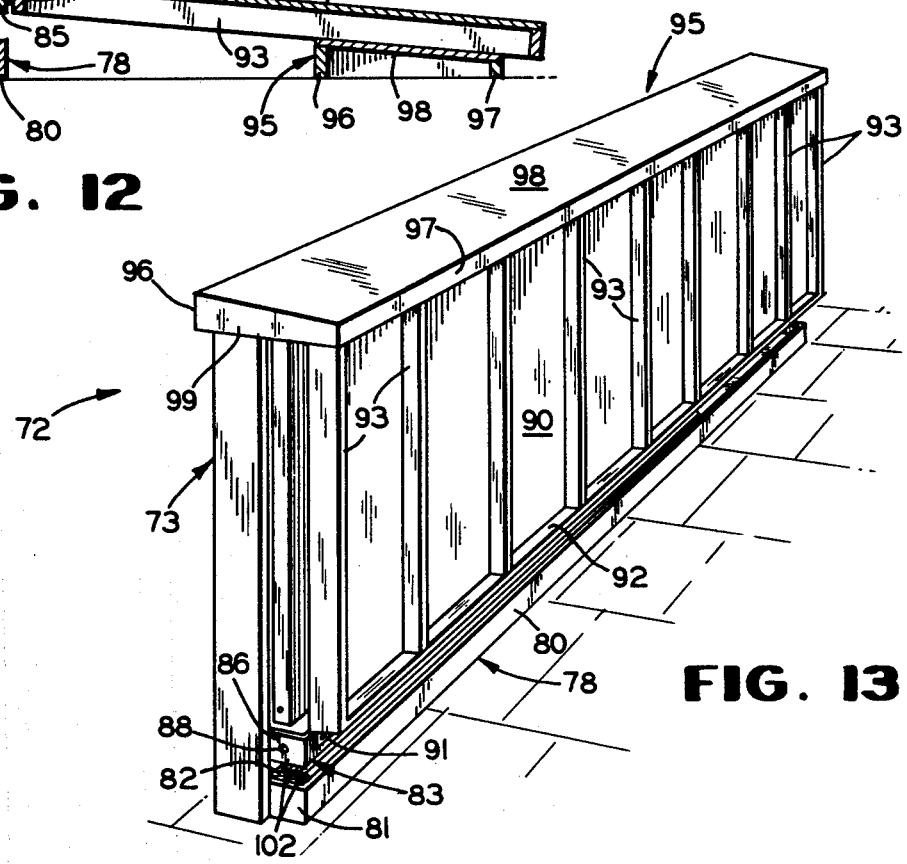
FIG. 13 is a view similar to FIG. 11, showing the multi-purpose structure in a folded, collapsed position with the solar collection system in an enclosed, protected position.

FIGS. 11 and 12 illustrate the extended, operative position of structure 72 for positioning the solar collector system 70 at an optimum angular attitude for heating the swimming pool water and in which the structure 72 is employed as a cabana presenting a deck and canopy or roof arrangement for bathers. During the non-swimming seasons, the support struts 102 are removed and the structure 72 folded into a collapsed position as shown in FIGS. 13 and 14 whereby the roof panel 100 along with the collector array 70 is swung downwardly into substantial parallelism with upright frame 73, and the deck panel 90 is swung upwardly into a parallel, closely spaced relation with the collector array 70 to cover and protect the same while presenting a pleasing appearance. The upper portion of the folded structure 72 can be closed by footer 95, which then serves as a closure cap member substantially enclosing the collector array 70 to shield it against adverse climatic conditions. In this folded, collapsed position, the structure 72 can serve as a barrier wall or fence along one side of the pool 71.

From the foregoing, it is apparent that the objects of the present invention have been fully accomplished. As a result of this invention, an improved solar energy collector of a light-weight, one-piece, plastic construction is provided for collecting and transmitting solar heat to a fluid flowing through the collector. The collector is formed to define a multiplicity of passages to form the fluid into multiple thin streams for optimum heat transfer. By the provision of restricted openings at the inlet end of each passage, fluid flow is evenly distributed through the passages and is especially significant when utilizing a number of serially connected collectors.

An array of such novel collectors is incorporated in a multipurpose structure for heating swimming pool water in its operative extended position while serving as a cabana like structure and which is collapsible into a folded position for enclosing and protecting the collector array against weathering while serving as a barrier wall along one side of the pool.

It is to be understood that the forms of the invention herein shown and described are to be taken as illustrative embodiments only of the same, and that various changes in the shape, size and arrangement of parts, may be resorted to without departing from the spirit of the invention.

We claim:

1. A solar energy collector comprising a body formed of plastic material in a one-piece unitary construction having an inlet manifold and an outlet manifold at the opposite ends thereof, and a multiplicity of elongated parallel flow passages in laterally spaced relation extending between and connecting said manifolds, each of said passages defined by a bottom wall and an exposed top wall surface having angularly related sloping wall portions extending in a diverging relation from a common apex juncture for presenting a maximum exposed surface to solar rays, and an inlet restriction adjacent at least one end of each passage said restriction defined by the top wall portions and a limited section of the bottom wall, said bottom wall section displaced upwardly into closer proximity to the top wall apex than the position of the bottom wall along the remaining elongated flow passage, said displaced bottom wall extending into said flow passage and thereby reducing the cross sectional area of said passage.

2. A solar energy collector according to claim 1, wherein said body is formed of a pair of sheet members fused together along laterally spaced lines substantially lengthwise of said body to form elongated webs between said passages.

3. A solar energy collector according to claim 2, wherein each passage is defined by oppositely displaced portions of said sheet members between said webs.

4. A solar energy collector according to claim 3, wherein said oppositely displaced portions define a tubular structure including said top wall and said bottom wall, said top wall terminating in laterally outwardly projecting flanges forming a part of said webs.

5. A solar energy collector according to claim 4, wherein said bottom wall comprises a planar wall portion and sloping wall portions extending from the ends of said planar wall portion upwardly in a diverging relation and terminating in laterally outwardly directed flanges fused to said first mentioned flanges.

6. A solar energy collector according to claim 1, wherein said restriction defines a tubular structure portion of triangular cross sectional configuration defined by said angularly related sloping wall portions of said top wall and a straight bottom wall portion extending between said sloping wall portions.

7. A solar energy collector according to claim 1, wherein said body is formed of a pair of sheet members fused together along the respective marginal edges thereof to form laterally projecting marginal flanges having apertures therethrough to facilitate securement of said body to a supporting surface.

8. A solar energy collector according to claim 7, including means insertable through said apertures for fastening said body to said supporting surface.

9. A solar energy collector according to claim 1, wherein each of said manifolds comprises an elongated hollow body having reduced diameter opposite end portions, said hollow body converging toward said reduced diameter end portions.

10. A solar energy collector according to claim 9, including circumferentially spaced ribs formed integral on the outer surface of said hollow body and extending substantially lengthwise thereof.

11. A solar energy collector according to claim 9, including a plurality of laterally spaced annular ribs formed integral about the outer surface of said hollow body.

12. A solar energy collector according to claim 1, wherein said body is formed of a pair of sheet members fused together along laterally spaced lines substantially lengthwise of said body to form elongated webs, each passage being formed between said webs by oppositely displaced portions of said sheet members and defining a tubular structure including said top wall and said bottom wall, said top wall terminating in laterally outwardly projecting flanges forming a part of said webs, said bottom wall comprising a planar wall portion and sloping wall portions extending from the ends of said planar wall portion upwardly in a diverging relation and terminating in laterally outwardly directed flanges fused to said first mentioned flanges.

13. A solar energy collector according to claim 12, wherein each of said manifolds comprises an elongated hollow body having reduced diameter opposite end portions, and circumferentially spaced ribs formed integral on the outer surface of said hollow body and extending substantially lengthwise thereof.

14. A solar energy collector according to claim 12, wherein each of said manifolds comprises a hollow body, and a plurality of laterally spaced annular ribs formed integral above the outer surface of said hollow body.

15. A series of solar energy collectors according to claim 1, including means coupling said manifolds to associated manifolds of adjacent solar energy collectors to form a solar energy collection system.

* * * * *